United States Patent

[11] 3,584,291

| [72] | Inventors | Mitchell S. Budniak<br>Chicago;<br>Russell D. Anderson, Schaumburg, both of, Ill. |
|---|---|---|
| [21] | Appl. No. | 845,986 |
| [22] | Filed | July 30, 1969 |
| [45] | Patented | June 8, 1971 |
| [73] | Assignee | Powers Regulator Company<br>Skokie, Ill. |

[54] PROPORTIONAL ELECTRIC HEAT CONTROL SYSTEM
7 Claims, 9 Drawing Figs.

[52] U.S. Cl.................................................. 323/18,
219/494, 219/501, 323/19, 323/24
[51] Int. Cl....................................................... G05d 23/00,
G05f 1/44
[50] Field of Search.......................................... 219/494,
501, 510; 307/310; 323/22, 19, 24, 38, 18

[56] References Cited
UNITED STATES PATENTS

| 3,191,068 | 6/1965 | Robb, Jr. ...................... | 307/310X |
| 3,281,808 | 10/1966 | Church et al. ................. | 307/310X |
| 3,365,654 | 1/1968 | Johnston ....................... | 323/22(SCR) |
| 3,506,852 | 4/1970 | DeHart.......................... | 323/22X SCR |

*Primary Examiner*—J. D. Miller
*Assistant Examiner*—A. D. Pellinen
*Attorney*—Hume, Clement, Hume and Lee

ABSTRACT: A proportional control circuit for controlling an output load in response to a plurality of input conditions which includes a plurality of sensing circuits for developing a respective DC voltage signal in response to a plurality of input conditions, ratio control in all but the first sensing circuit for adjusting the relative proportional effect that the respective sensing circuits will contribute to the output load, a summer and amplifier to develop an error voltage signal from the signals of the plurality of sensing circuits, a reference circuit for generating a sawtooth reference voltage signal, a comparator circuit for comparing the voltage reference signal to the error voltage signal wherein an output signal to the load is obtained only when the magnitude of the error voltage signal is less than the magnitude of the reference voltage signal.

Inventors
Mitchell S. Budniak, &
Russell D. Anderson.
By Hume, Clement, Hume, & Lee
Attys.

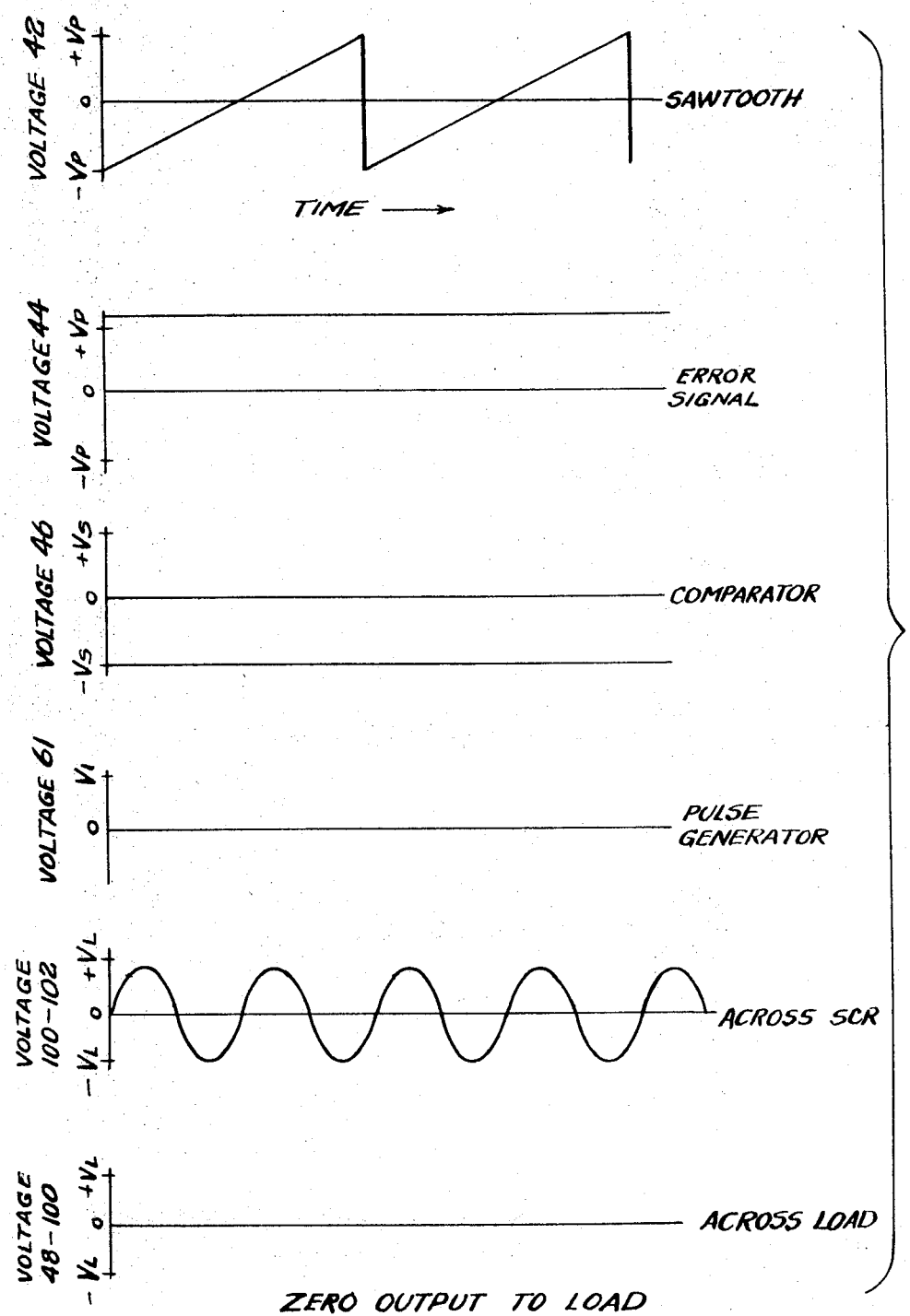

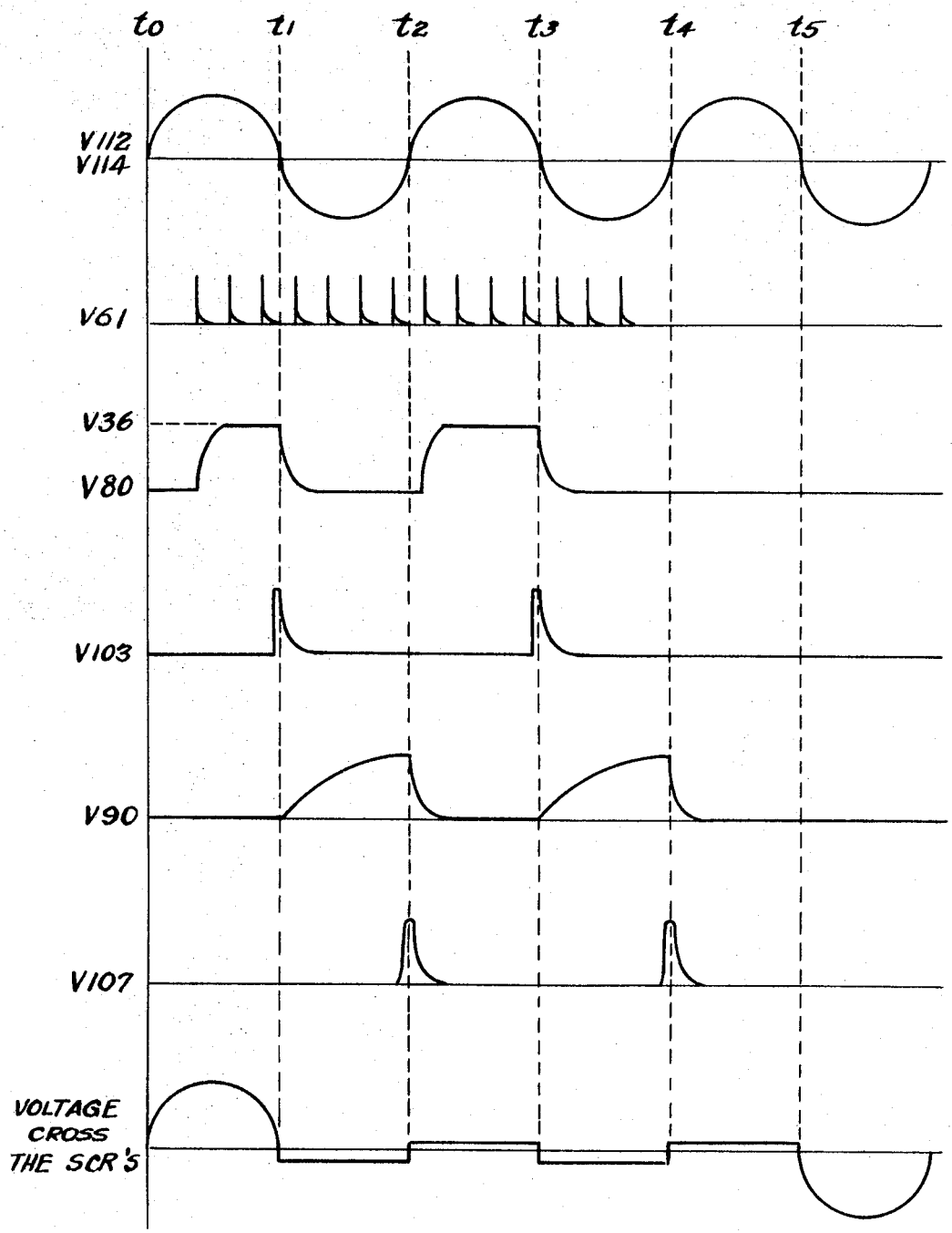

PROPORTIONAL ELECTRIC HEAT CONTROL SYSTEM

FIELD OF THE INVENTION

The present invention relates generally to improvements in electrical power regulating circuits for controlling the flow of electric power to a load, and more particularly to a new and improved regulator circuit for supplying power to a load in response to plurality of input conditions wherein each input condition beyond the first input may have a different proportional effect on the load. Those concerned with the development of temperature control systems have long recognized the need for controlling the AC line power to a heating unit. By comparing several temperature signals, from remote points, with a reference signal and switching power on or off as controlled by this comparison, the present invention fulfills this need. The control system enables a proportional comparison of these remote temperature conditions wherein the temperature of additional rooms may proportionally contribute the same or less to the end result than the temperature in the first room.

SUMMARY OF THE INVENTION

The present invention contemplates a unique power regulator circuit utilizing a plurality of sensing devices that generate a plurality of output signals which are then combined to form an error voltage signal. This error voltage signal is then compared with a reference signal. When the error signal is less than the reference signal, a pulse train is generated. This pulse train then controls a zero switching circuit which enables power to be selectively applied to a load.

Therefore, an object of the present invention is the provision of an electrical controller which allows the proportional comparison of a plurality of input conditions.

Another object is to provide a regulator system that supplies power to a load intermittantly.

A further object is the provision of a regulator system that is compatible with a zero switching circuit to supply power to a load through a switch which is operative at approximately the AC crossover point of a supply voltage.

Still another object is to provide a regulator system having external adjustments that determine the temperature around which the system will control.

Other objects and many of the attendant advantages of this invention will be readily appreciated as the same becomes better understood by reference to the following detailed description when considered in connection with the accompanying drawings.

BRIEF DESCRIPTION OF THE DRAWINGS

FIGS. 3 through 7 illustrate different waveforms present in the circuit of FIG. 1;

FIG. 9 illustrates different wave forms present in the circuit of FIG. 8.

DESCRIPTION OF THE PREFERRED EMBODIMENTS

Figure 1:
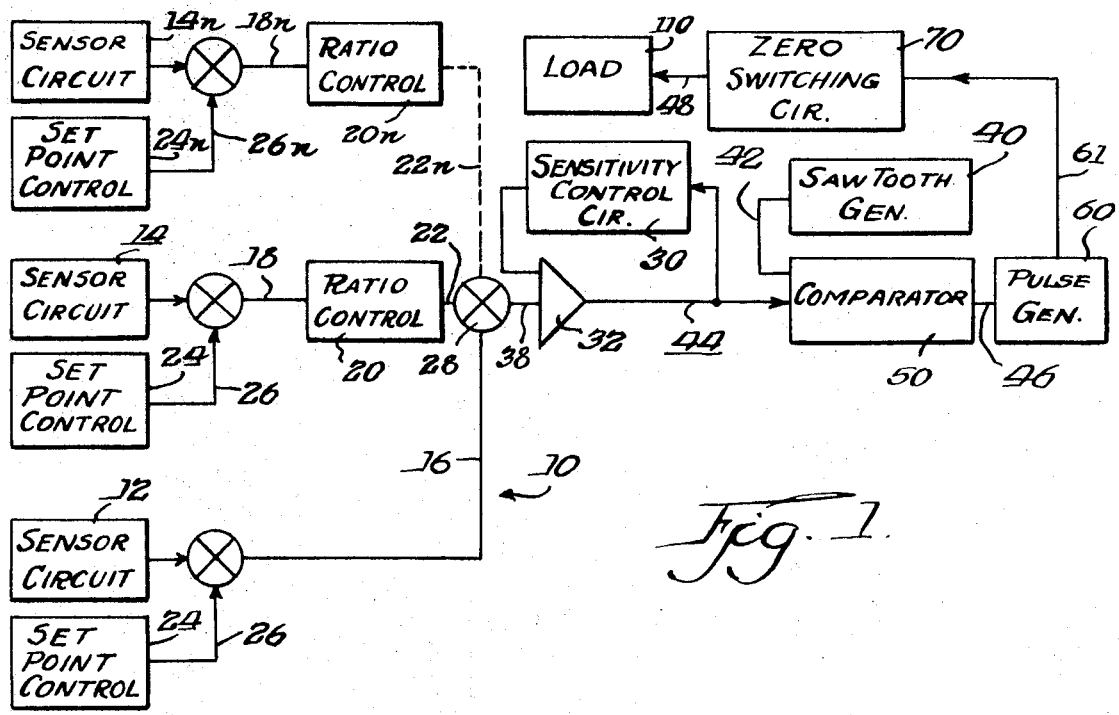
FIG. 1 is a block diagram of an exemplary form of the present invention.

Referring now to the drawings, wherein like reference characters designate like or corresponding parts throughout the several views there is shown in FIG. 1 which illustrates a preferred embodiment, a proportional electrical control system 10 having a plurality of sensor circuits 12 and 14 through 14n connected in parallel. While only three sensor circuits are shown, it will be recognized by one skilled in the art that any number of sensor circuits from two to infinity may be utilized. Sensor 12 produces a voltage signal at its output 16, representative of a first condition to be sensed. Sensor 14 likewise produces a voltage at its output 18 representative of a second condition to be sensed. Sensor 12 can be referred to as the master sensor, while all other sensors connected in parallel (14 through 14n) to it may be referred to as the submaster sensor circuits. Connected to the output of each of the submaster circuits, is a ratio control circuit 20.

The ratio control circuit 20 accepts the output from a submaster sensor circuit 14 and attentuates it between limits that are continuously adjustable through an external means in order to adjust the relative proportional effect that the sensing circuit 14 will contribute to the final output signal. For example, if sensor circuit 12 and sensor circuit 14 were to be given equal weight, then the ratio control circuit would multiply the output voltage from sensor circuit 14 by a factor of 1. On the other hand, if sensor circuit 14 were to contribute only one-half as much as sensor circuit 12, then the ratio control circuit would multiply the output voltage at output 18 by a factor of one-half. Likewise, all other submaster channels would similarly be multiplied by a given ratio, determined by the relative proportional effect that each is to have on the total output.

A set point control circuit 24 is provided in parallel with each sensor circuit to give an external adjustment that determines the ambient condition around which the system will control. For example, if the proportional electric control system 10 were utilized in a temperature sensing system, set point control circuit 24 would determine the temperature around which the system would operate. The set point control circuit 24 provides a DC bias which adjusts the point of operation. The DC voltages at the output 16 of sensor circuit 12, output 22 of ratio control circuit 20, and outputs 26 of each set point control circuit 24, are then added together at point 28 to produce an error voltage corresponding to the amount of difference of the condition from the set point. This error voltage may be read at output 44 of amplifier 32. The error voltage is then amplified through an operational amplifier 32. A sensitivity control feedback circuit 30 is provided to change the gain of the amplifier in order to increase the sensitivity of the system. Output 44 from amplifier 32, still representative of the error voltage, is then compared with a time varying reference voltage generated by sawtooth generator 40 by a comparator circuit 50. If the error signal is less than the reference signal, a positive voltage is produced at output 46 of the comparator 50. This voltage is then applied to a pulse generator 60 which continuously generates pulses at output 61 so long as the positive voltage is provided to the input of generator 60 from the comparator 50. Pulse generator 60 is a free running oscillator providing pulses to a zero switching circuit 70 when turned on by comparator 50. The zero switching circuit 70 passes energy to a load 110 only when pulses are provided by pulse generator 60.

Figure 2:
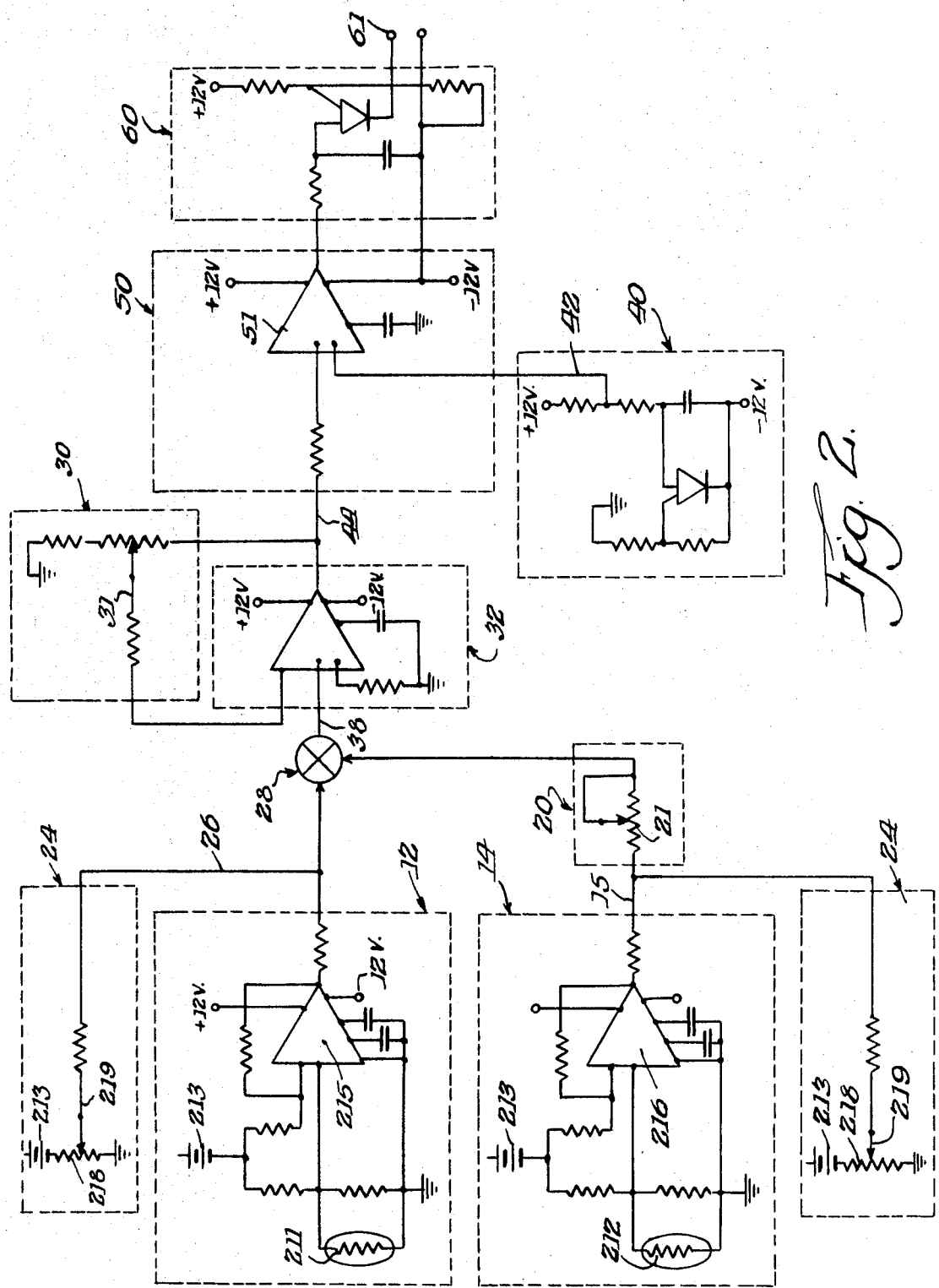
FIG. 2 is a schematic diagram of the proportional electrical control system.

Referring now to FIG. 2 taken together with FIG. 1, the proportional electrical control system 10 is shown in more detail. In a preferred embodiment, the proportional electrical control system 10 is used as a heat controller. Sensing circuits 12 and 14 are used to measure the temperatures at different locations. From the reading that these sensors provide, an output voltage is obtained which is added to an ambient temperature condition representative by a set point control circuit 24 connected in each sensor circuit, to form an error voltage signal. This error voltage signal is then compared with a reference voltage and whenever the error signal is less than the reference voltage signal, an output is produced which supplies power to a load. In a heat control system, the load would be a resistive heating element. However, it is to be understood that this system may be utilized with many types of loads and sensing conditions.

In a preferred embodiment, sensor circuits 12 and 14 comprise thermistors 211 and 212 which perform essentially identically. The thermistors sense the temperature of the environment to be controlled and provide a resistance in ohms corresponding to that temperature. A constant voltage 213 is present in each circuit. This voltage causes a current to flow through thermistors 211 and 212 respectively, and provide an input signal to operational amplifiers 215 and 216. These amplifiers accept the output of the sensor and convert it into a negative DC voltage corresponding to the temperature that is sensed.

A set point control circuit 24 is connected in parallel with each sensor circuit to calibrate the control system to determine around what temperature the system will operate. A voltage is provided from DC source 213 creating a current flow through voltage divider 218. Variable wiper arm 219 picks off a voltage representative of the set point condition. This voltage on the output of the voltage divider at point 26 is then summed with the voltage from the output of each sensor circuit 12, 14.

The output point 15 from sensor 14 and set point control 24 is connected to a ratio control circuit 20. A ratio control circuit 20 is connected to each sensor circuit except for one, the master sensor circuit. The potentiometer 21 is adjusted to give a proportional weight to the sensor circuit in which it is connected. For example, the effect of sensor 14 on the total system may be varied from approximately 0 percent to 100 percent when compared with the effect of sensor circuit 12.

The voltage output from ratio control circuit 20 plus the output voltage sum from sensor 12 and set point control 24 are then summed at point 28. The output at point 28 is placed on one input of an operational amplifier 32. Operational amplifier 32 has a sensitivity control circuit 30. Sensitivity control circuit 30 is a feedback path 31 which provides an amplification factor for the amplifier. Sensitivity control circuit 30 is continuously adjustable and changes the gain of the amplifier through the feedback path 31 in order to change the rate of change in the amplifier output voltage per change in the error voltage. The output signal 44 of amplifier 32 is a DC voltage signal.

Figure 8:
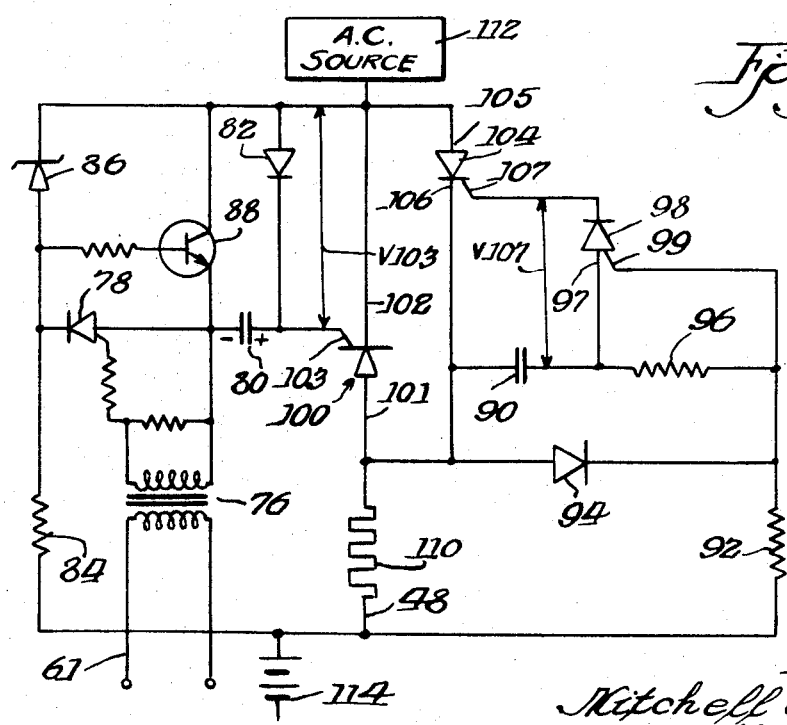
FIG. 8 is a schematic diagram of the zero switching circuit.

Now referring to FIGS. 1 through 7, it can clearly be seen that error voltage 44 is a DC voltage which is representative of an error voltage signal. This voltage is applied to a conventional comparator 50 which comprises an operational amplifier 51 having biasing means and resistance means on the input. A conventional sawtooth generator 40 provides a sawtooth reference voltage to the second input of operational amplifier 51. Error voltage 44 and reference sawtooth voltage 42 are compared in comparator 50. It can be seen in FIG. 3 that the comparator has an output 46 only when the error voltage 44 is less than the sawtooth voltage 42. The output 46 of comparator 50 is applied to a conventional pulse generator 60 which has a four layer diode and an RC network. The output 61 of pulse generator 60 is then applied to the input of a zero switching circuit 70. The zero switching circuit is shown in FIG. 8 and will be explained below.

Figure 3:
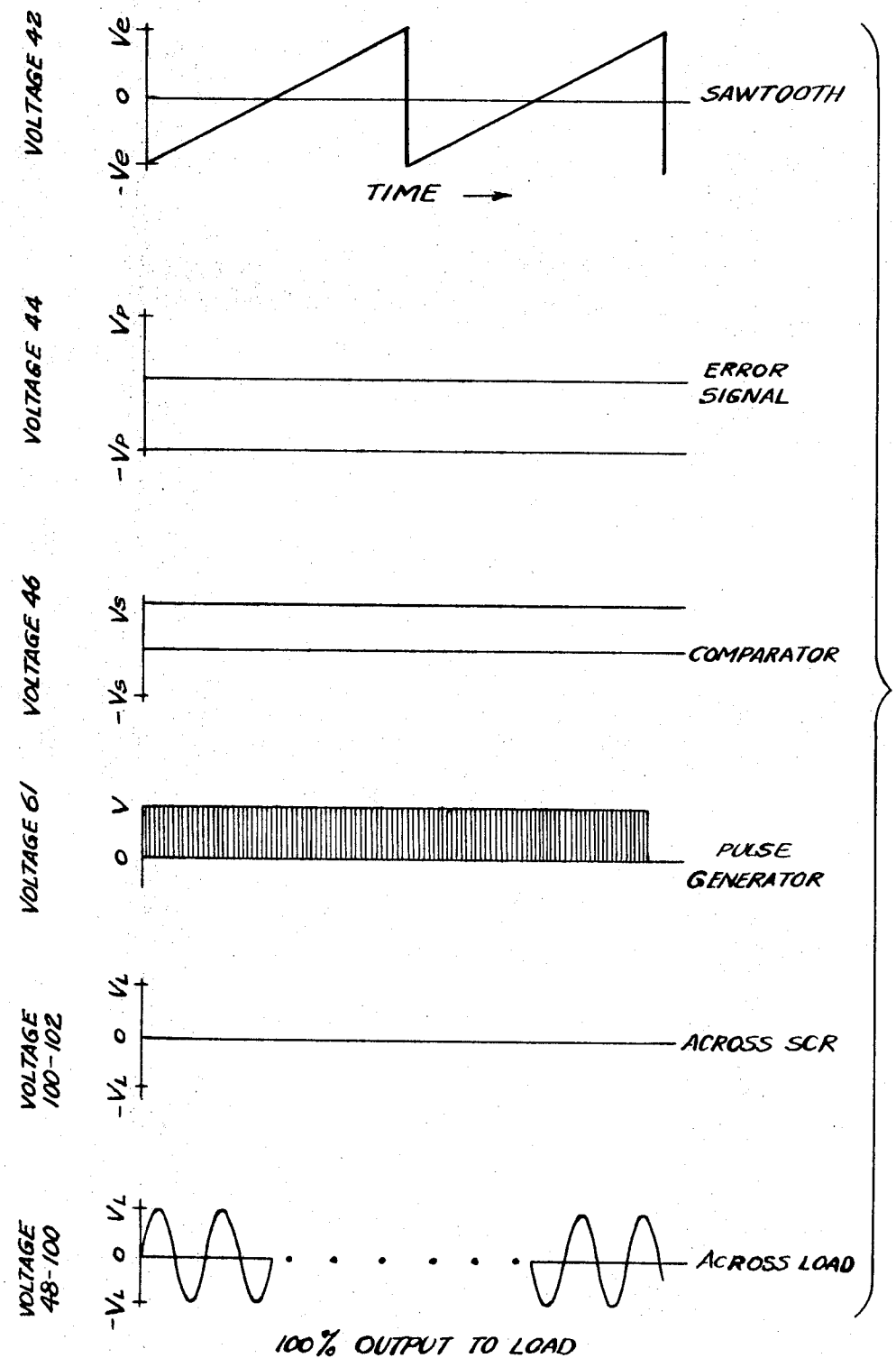

In FIG. 3, there is a constant comparator pulse output since error voltage 44 is always less than sawtooth output 42. Whenever there is an output 46 from the comparator 50, pulse generator 60 will yield an output of pulses at point 61.

Figure 4:
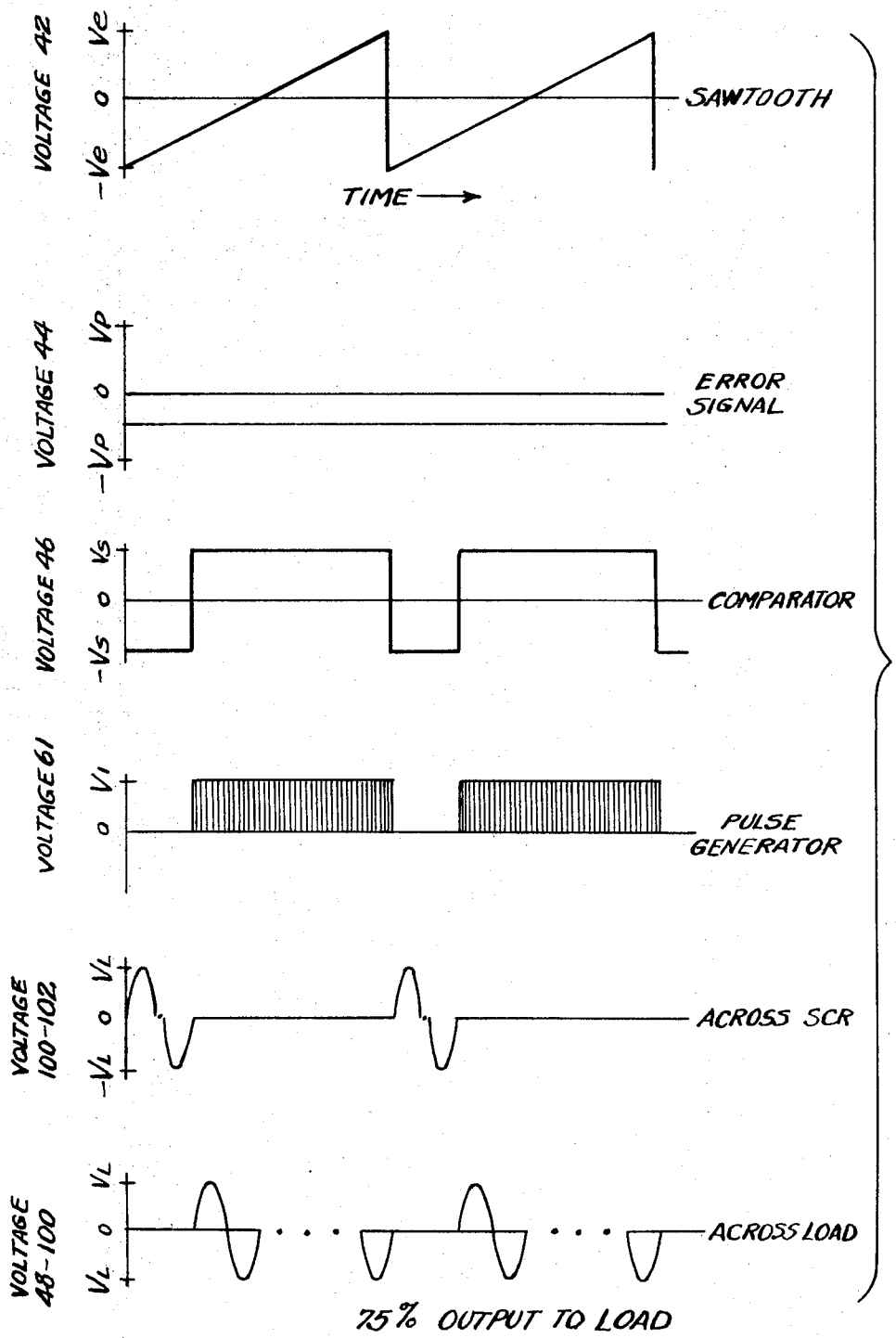

FIG. 4 is representative of a 75 percent output. Here, error voltage 44 is less than the magnitude of sawtooth voltage 42 for 75 percent of the period and, during the remaining 25 percent of the time, the magnitude of the sawtooth output 42 is less than the error voltage 44 and, there will be no output signal from comparator 50 and therefore no pulses from pulse generator 60 during this period.

Figure 5:
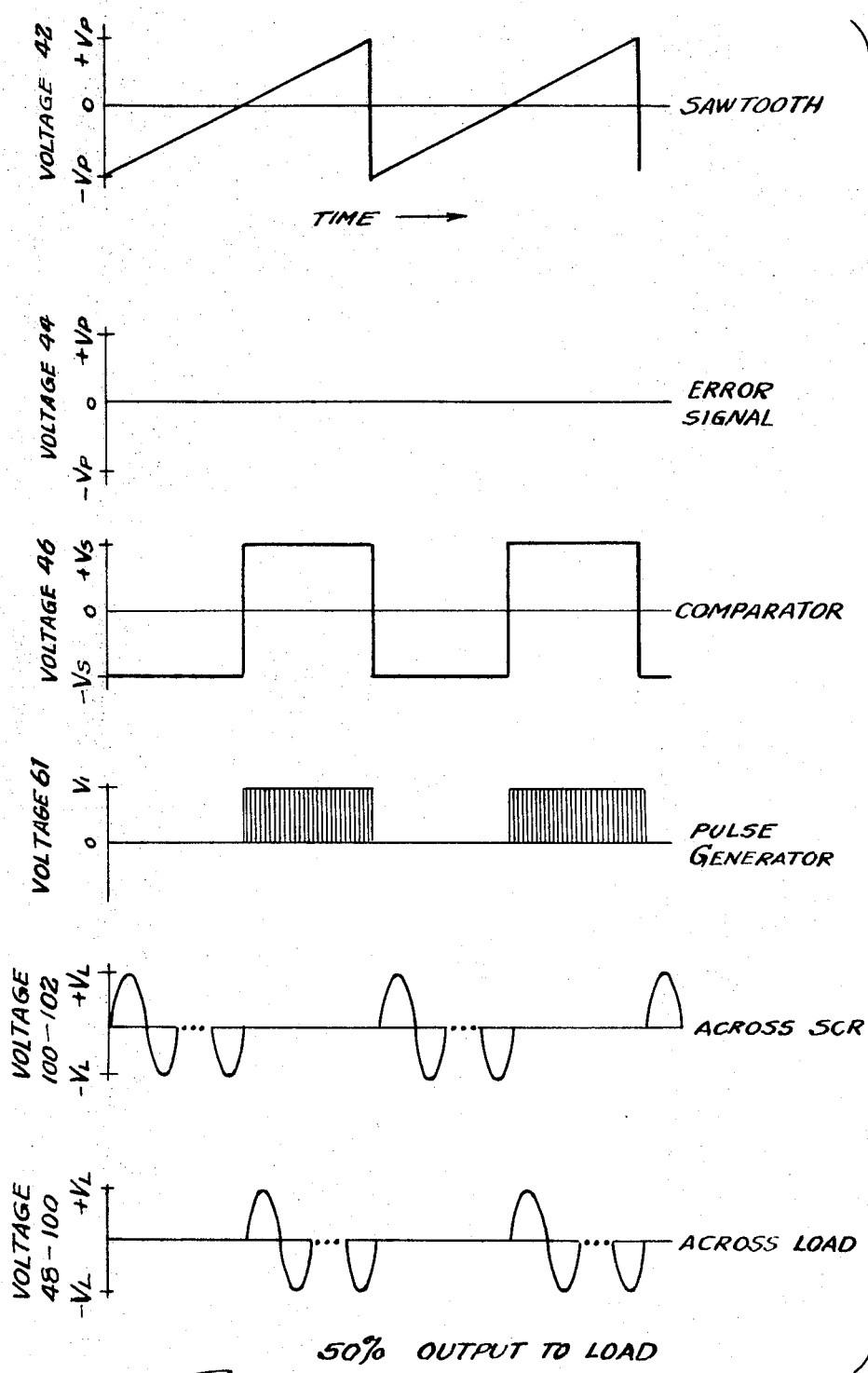
Figure 6:
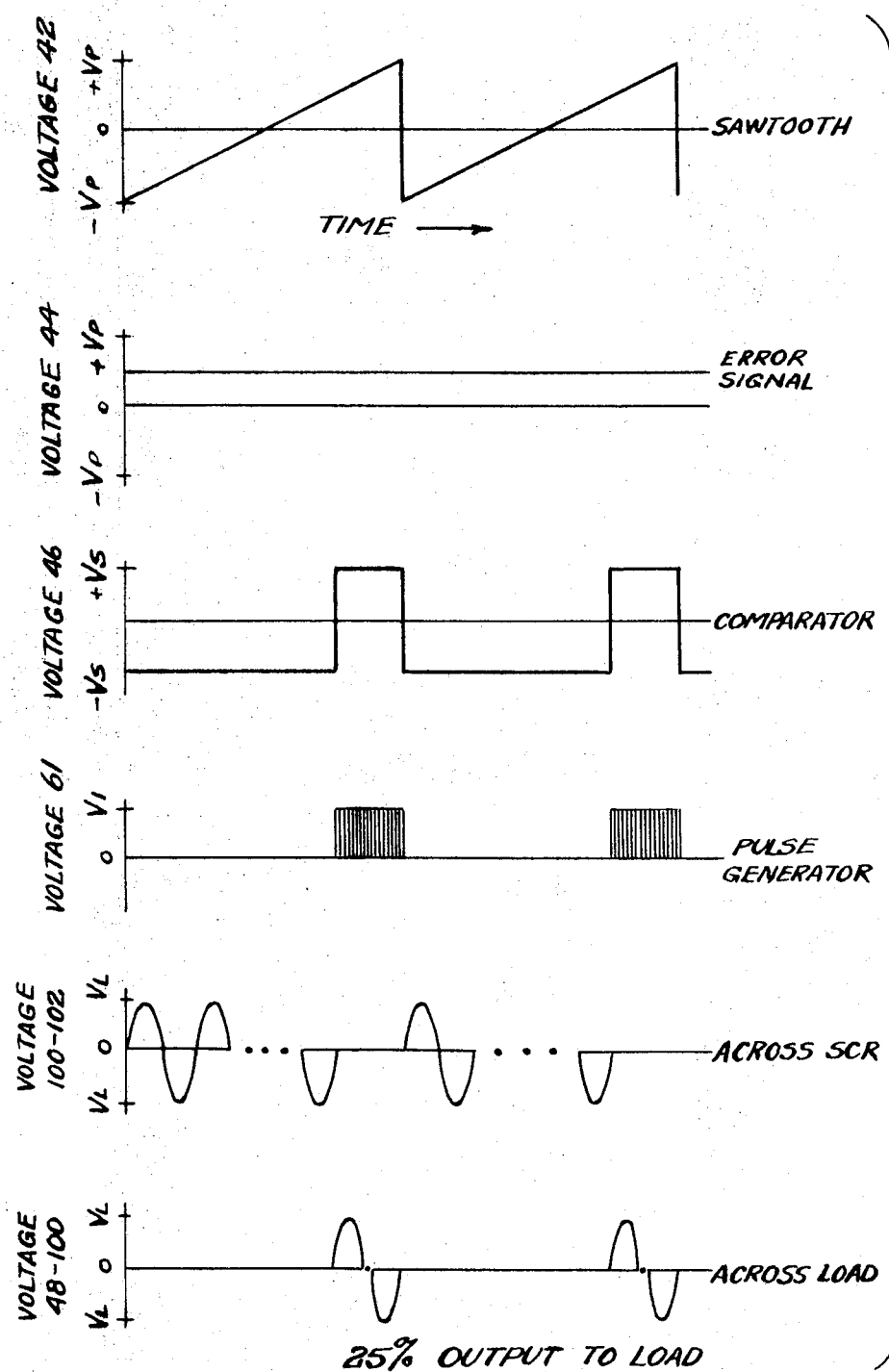

Likewise, FIGS. 5 and 6 represent the magnitude of error voltage wherein an output from pulse generator 60 is only obtained 50 percent and 25 percent of the time, respectively. FIG. 7 is representative of the condition where there is no output obtained since the magnitude of error voltage 44 is always greater than the magnitude of saw tooth voltage 42. The condition in FIG. 7 is in essence, the steady state system for a heat control embodiment. So long as the temperatures remain constant, no output will be received from the pulse generator and no current will be delivered to the load 110.

It will be recognized by one skilled in the art that proportional heat control circuit 10 may be modified in such a manner that error voltage 44 may be compared with a positive time varying reference voltage and where an output from comparator 50 will only occur when the magnitude of error voltage 44 is greater than the magnitude of the time varying reference voltage.

Now, referring to FIGS. 8 and 9, the operation of the zero voltage switch will be explained. The function of the zero voltage switch is to alternatively fire a pair of silicon controlled rectifiers (one for each half cycle of line voltage) to pass line energy to a load element. When utilized in conjunction with the proportional electric control system 10, the zero voltage switch 70 provides power to a load 110 during the period of the cycle in which the pulse generator 60 is providing output pulses. The firing circuits are arranged to fire the SCR's as close as possible to the point of crossover or zero instantaneous voltage on the line in order to minimize the production of transients on the line which would affect other equipment connected to the line, hence, the term "zero switching."

Referring now to FIGS. 8 and 9, the load 110 is connected to an AC supply source 112 through SCR 100 and 104. The SCR's are conventional SCR's having anodes 101 and 105, cathodes 102 and 106, and gates 103 and 107, respectively. SCR's 100 and 104 are connected in back-to-back relationship such that the anode of SCR 100 is connected to the cathode of SCR 104 and the anode of SCR 104 is connected to the cathode of SCR 100. Two firing circuits are provided. The first firing circuit broadly comprises a pulse transformer 76, two switches (four layer diode 78 and transistor 88), zener diode 86, diode 82, and capacitor 80 which are arranged to render SCR 100 conductive. A second firing circuit is associated to render SCR 104 conductive and broadly comprises a four layer diode 98, a diode 94, and a capacitor 90.

Referring now to FIG. 9, two conditions are required in order to cause SCR's 100 and 104 to become conductive. First, pulses must be received from pulse generator 60 at point 61 long enough before time $t$ to allow capacitor 80 to change. Second, the line voltage must be of proper polarity. If SCR 100 does not conduct between $t_1$ and $t_2$ then SCR 104 will not conduct between $t_2$ and $t_3$. Therefore, at some time before $t_1$ when the AC voltage $V_{112}$ is positive with respect to the voltage $V_{114}$ and when a signal pulse $V_{61}$ is applied to pulse transformer 76 at terminals 61, four layer diode 78 will be triggered into the conducting state thereby charging capacitor 80 through diode 82, four layer diode 78 and resistor 84. Capacitor 80 will charge to the voltage $V_{86}$ of zener diode 86. At $T_1$ minus when the voltage $V_{112}-V_{114}$ is less than the voltage $V_{80}$ across capacitor 80, transistor 88 will be biased positive and discharge capacitor 80 through gate 103 of SCR 100. This trigger signal $V_{103}$ is necessary to render SCR 100 conductive and will extend into the $T_1$plus region. At $T_1$plus, $V_{112}-V_{114}$ is negative and anode 101 is positive with respect to cathode 102 and since, gate 103 is positive SCR 100 will go into the conduction state for the rest of the half cycle $T_1$ to $T_2$.

At $T_1$ plus, SCR 100 is in the conducting state and capacitor 90 will charge through the resistor 92, resistor 96, and SCR 100 to a voltage $V_{90}$ across capacitor 90. At $T_2$ minus when the absolute value of the AC voltage is less than the voltage $V_{90}$ across capacitor 90, the anode 97 of the four layer diode 98 will be positive with respect to gate 99 of four layer diode 98 thereby turning four layer diode 98 into conducting state. Capacitor 90 will discharge through four layer diode 98 into gate 107 of SCR 104, providing a trigger voltage $V_{107}$ in a similar manner to the discharge of capacitor 80 into gate 103 of SCR 100 and thereby turning SCR 104 into a conducting state at $T_2$ plus when anode 105 of SCR 104 is positive with respective to the cathode 106 of SCR 104.

It can thus be seen that by utilizing a zero voltage switch, there will be an output to load 110 whenever an input pulse is placed on pulse transformer 76 in time to turn on SCR 100 and whenever SCR 100 conducts, SCR 104 will eventually conduct. Therefore, when utilized with proportional electrical control system 10, whenever the error voltage 44 is less than the reference voltage 42, pulses will be applied to pulse transformer 76 and when the AC voltage reaches a crossover point, the SCR's will alternately conduct thereby rendering a current to the load 110.

What we claim is:

1. A proportional heat control circuit for controlling an output to a load in response to a plurality of input temperature conditions comprising:
   a first and second temperature sensing means for developing a first and a second voltage signal representative of a first and second temperature condition respectively;
   means associated with each of said first and second sensing means for establishing a signal representative of an ambient temperature condition around which said first and second sensing means operate and wherein said means each generate a constant voltage signal representative of said ambient temperature condition;
   ratio control means for adjusting the relative proportional effect that said second temperature sensing means will contribute to said output load in relation to said first temperature sensing means, wherein said control means comprises a variable resistor connected in series with said second temperature sensing means;
   means for developing an error voltage signal from said signals of said first and second temperature sensing means, from said ambient temperature condition means and from said ratio control means comprising an operational amplifier;
   means for changing the sensitivity of said operational amplifier comprising a resistive feedback path around said operational amplifier;
   means for generating a sawtooth reference voltage signal;
   means for comparing said sawtooth reference voltage signal with said error voltage signal wherein an output signal is obtained only when the magnitude of said error voltage signal is less than the magnitude of said reference voltage signal;
   pulse generator means connected to said comparing means wherein a voltage pulse is generated only when said output signal is applied to said pulse generator means; and
   a zero voltage switching means connected to said pulse generator means wherein a signal is provided to said load only when said pulse generator is generating a pulse.

2. A proportional heat control circuit as defined in claim 1 wherein said zero voltage switching means comprises
   an AC source;
   a first and second SCR connected to said AC source, and SCR's being connected in back-to-back relationship;
   said load connected to said SCR's;
   a first means to render said first SCR conductive at a first zero crossover point of said AC source comprising a first and second switch means, a first capacitor and a first breakdown diode;
   a second means to render said second SCR conductive at a second alternative zero crossover point of said AC source comprising a third switch means and a second capacitor;
   a third means connected to said pulse generator means and to said first means for supplying a train of pulses to render said first and second switches conductive only when said pulses are present and wherein said first SCR becomes conductive when said AC source changes from positive to negative; and
   said first SCR being connected to said second means to render said third switch means conductive and wherein said second SCR becomes conductive only when said AC source changes from negative to positive and said first SCR is conductive.

3. The zero switching circuit of claim 2 wherein said first and third switch means are four layer diodes, 4. The zero switching circuit of claim 3 wherein said second switch means is a transistor, 5. The zero switching circuit of claim 4 wherein said third means is a pulse transformer.

6 The zero switching circuit of claim 5 wherein the pulses applied to said pulse transformer are developed from a proportional control circuit.

7. A proportional control circuit for controlling an output load in response to a plurality of input conditions comprising:
   a first sensing means for developing a first variable DC voltage signal in response to a first sensed condition, said first variable DC voltage signal having a predetermined polarity and an amplitude which varies proportionately with variations in said first sensed condition;
   a first setpoint control means for summing with said first variable DC voltage signal an adjustable DC setpoint potential of polarity opposite to said first variable DC voltage signal;
   a second sensing means for developing a second variable DC voltage signal in response to a second sensed condition, said second variable DC voltage signal having the same polarity as the first variable DC voltage signal and an amplitude which varies proportionately with variations in said second sensed condition;
   a second setpoint control means for summing with said second variable DC voltage signal a second adjustable DC setpoint potential of polarity opposite to said second variable DC voltage signal;
   ratio control means connected to said second sensing means and said second setpoint control means for adjusting the relative proportional effect of said second sensing means on control of said output load in relation to said first sensing means by adjustment of the sum of the second variable DC voltage signal and said second DC setpoint potential in linear proportion relative to the sum of said first variable D.C. voltage signal and said first DC setpoint potential;
   means for summing the output of said ratio control means with the sum of said first variable DC voltage signal and said first DC setpoint potential to provide a composite DC condition error signal;
   means for amplifying said composite condition error signal;
   an adjustable resistive feedback path around said amplifying means for adjustment of the gain of said amplifying means for sensitivity control; and
   means responsive to the output of said amplifying means to provide an output load control signal.

PO-1050
(5/69)

UNITED STATES PATENT OFFICE
CERTIFICATE OF CORRECTION

Patent No. 3,584,291    Dated June 8, 1971

Inventor(s) MITCHELL S. BUDNIAK and RUSSELL D. ANDERSON

It is certified that error appears in the above-identified patent and that said Letters Patent are hereby corrected as shown below:

Column 4, line 34, "time t" should read --time $t_1$--.

Signed and sealed this 2nd day of November 1971.

(SEAL)
Attest:

EDWARD M. FLETCHER, JR.
Attesting Officer

ROBERT GOTTSCHALK
Acting Commissioner of Patents